(12) United States Patent
Richard

(10) Patent No.: US 9,630,569 B2
(45) Date of Patent: Apr. 25, 2017

(54) FIELD OF VISION DISPLAY DEVICE FOR A SUN VISOR OF A VEHICLE

(71) Applicant: William J. Richard, Spring, TX (US)

(72) Inventor: William J. Richard, Spring, TX (US)

( * ) Notice: Subject to any disclaimer, the term of this patent is extended or adjusted under 35 U.S.C. 154(b) by 0 days.

(21) Appl. No.: 14/306,709

(22) Filed: Jun. 17, 2014

(65) Prior Publication Data

US 2015/0360618 A1  Dec. 17, 2015

(51) Int. Cl.
  *B60R 11/04* (2006.01)
  *B60R 1/00* (2006.01)
  *B60R 11/02* (2006.01)
  *B60R 11/00* (2006.01)

(52) U.S. Cl.
  CPC ............ *B60R 11/04* (2013.01); *B60R 1/00* (2013.01); *B60R 11/0235* (2013.01); *B60R 11/0252* (2013.01); *B60R 2011/008* (2013.01); *B60R 2011/0035* (2013.01); *B60R 2011/0059* (2013.01); *B60R 2300/202* (2013.01)

(58) Field of Classification Search
  CPC .... B60J 3/0204; B60R 11/04; B60R 11/0252; B60R 11/0235
  USPC ....................................................... 296/97.6
  See application file for complete search history.

(56) References Cited

U.S. PATENT DOCUMENTS

| | | | | |
|---|---|---|---|---|
| 5,289,321 A | * | 2/1994 | Secor | 359/896 |
| 5,490,708 A | * | 2/1996 | Lee | 296/97.8 |
| 5,680,123 A | * | 10/1997 | Lee | 340/937 |
| 5,940,120 A | * | 8/1999 | Frankhouse et al. | 348/61 |
| 5,971,468 A | * | 10/1999 | King | 296/97.5 |
| 6,611,384 B1 | | 8/2003 | Biverot | |
| 7,184,074 B1 | * | 2/2007 | Jansen | 348/151 |
| 7,413,233 B1 | | 8/2008 | Jung | |
| 7,898,434 B2 | | 3/2011 | Taniguchi et al. | |
| 8,547,298 B2 | | 10/2013 | Szczerba et al. | |
| 8,570,188 B2 | | 10/2013 | Yamashita | |
| 2002/0159270 A1 | * | 10/2002 | Lynam et al. | 362/492 |
| 2010/0094501 A1 | * | 4/2010 | Kwok | 701/36 |

FOREIGN PATENT DOCUMENTS

| | | |
|---|---|---|
| JP | 20040064131 | 2/2004 |
| JP | 20050297762 | 10/2005 |

\* cited by examiner

*Primary Examiner* — Pinel Romain
(74) *Attorney, Agent, or Firm* — Tumey L.L.P.

(57) ABSTRACT

A display device adapted to be releasably mounted on a sun visor of a vehicle. The device includes a forwardly facing camera and a computer device such as a "tablet" including a display screen. The display screen is supported by the sun visor and is viewable by the driver or passenger of the vehicle. The field of vision obstructed by the visor when the visor is deployed is displayed on the display screen so that the entire field of vision is available to the driver.

4 Claims, 2 Drawing Sheets

FIELD OF VISION DISPLAY DEVICE FOR A SUN VISOR OF A VEHICLE

BACKGROUND OF INVENTION

1. Field of the Invention

This invention is directed to a display device that is detachably connected to a sun visor. When the visor is pivoted downwardly, a portion of the driver's field of vision is obstructed. The invention provides for a display device attachable to the sun visor so that it is visible to the driver of the vehicle. A second portion of the device overlies the front surface of the visor and includes a camera. The camera captures the field of vision in front of the vehicle and displays it on the display device.

2. Description of Related Art

U.S. Pat. No. 8,570,188 discloses a system for displaying a portion of the forward field of vision that is obstructed due to the side pillars 12a and 12b. A camera 20 sends the image to a control apparatus 30 which his connected to image display apparatus 40 which is located in the dashboard.

U.S. Pat. No. 6,611,384 discloses a camera 13 connected to a live transmitter. A converter 2 and direction changing means 3 and 4 can be integrated in a sun visor. Converter 2 deflects radiation 17 from line transmitter to changing means 3 and 4 by which a direct image of the surroundings is displayed to the observer 7.

Japanese application 2004-116782 published Oct. 27, 2005 discloses a system for displaying obstructed views on display devices that are positioned on the front pillars and the sun visor. Cameras C1, C2 and C3 are apparently provided on the roof of the vehicle.

U.S. Pat. No. 7,413,233 discloses a prompter section 28 which is pivotably connected to the lower portion of a sun visor 12.

BRIEF SUMMARY OF THE INVENTION

The invention disclosed herein is for a display device that is adapted to be releasably attached to a conventional sun visor. The display device includes a screen that is positioned on the sun visor to cover the inwardly facing flat portion of the sun visor when it is deployed in a vehicle. The devise also includes a front planar portion that fits over the forwardly disposed portion of a deployed sun visor. The front planar portion supports a digital camera for recording the forward field of vision. The device includes known software to display the images captured by the camera on a screen that is positioned over the rear surface of the visor. In this manner, the portion of the driver's view that is obstructed by the sun visor is now visible to the driver on the display.

BRIEF DESCRIPTION OF THE SEVERAL VIEWS OF THE DRAWING(S)

DETAILED DESCRIPTION OF THE INVENTION

Figure 1:
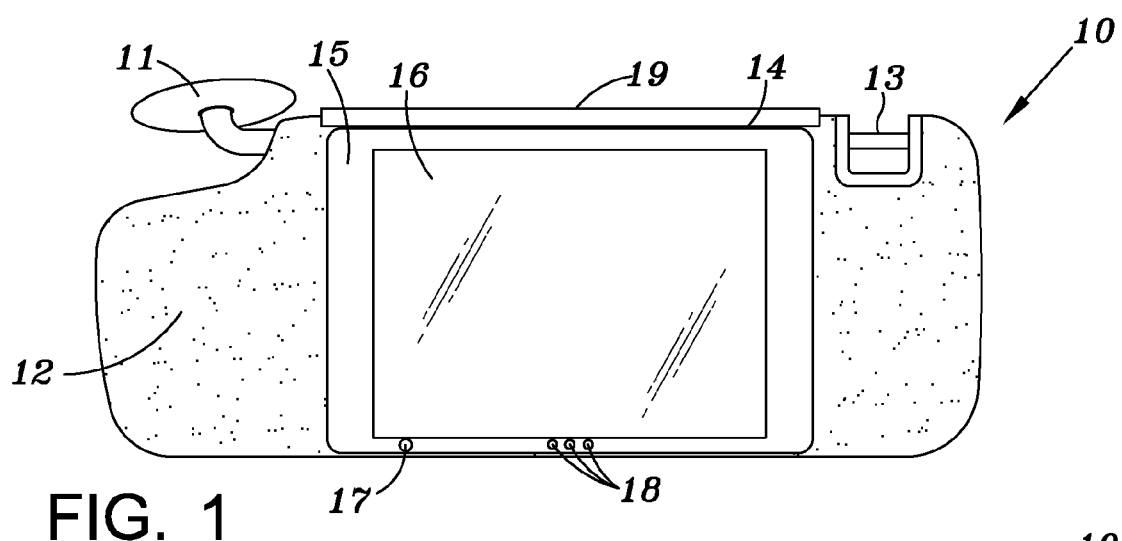
FIG. 1 is a front view of an embodiment of the display device according to the invention.
Figure 2:
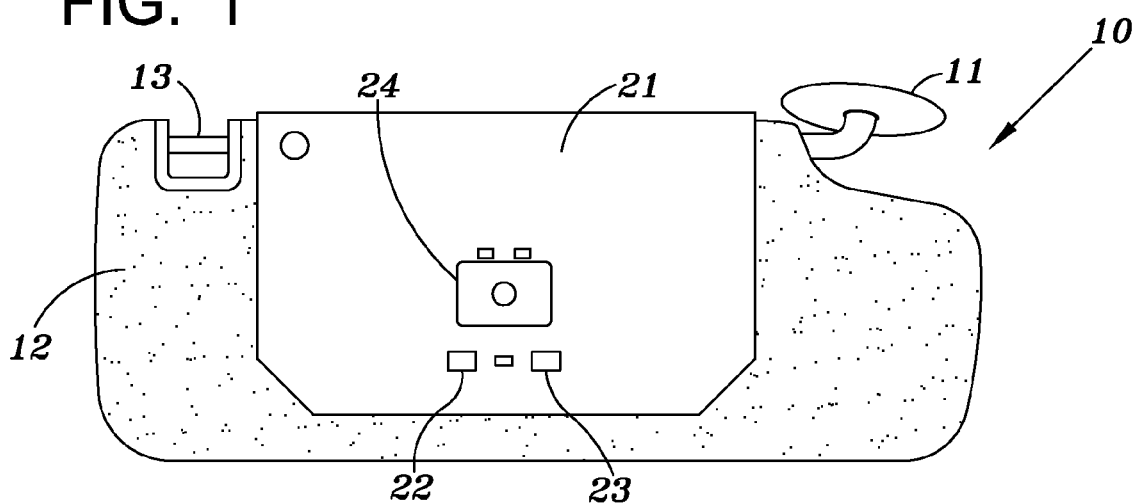
FIG. 2 is a rear view of the device shown in FIG. 1.

Referring to FIGS. 1 and 2, an embodiment of the display device 10 is shown as supported by a visor 12 of an automobile and the like. A typical visor 12 for the driver or a passenger of a vehicle is rotatably mounted as at 11 to the inside of a roof of a vehicle. A generally flat planar member receives a rod 13 about which the visor may pivot between a position where the planar member 12 is adjacent to and relatively parallel to the roof and a position in which the planar member is general perpendicular to the roof but partially obstructing the vision of a driver or passenger.

The inwardly facing portion 15 of the device includes a computing device which is commonly referred to as a "tablet" and includes a display screen 16. An example of such a device is the iPad tablet manufactured by Apple Inc.

Figure 3:
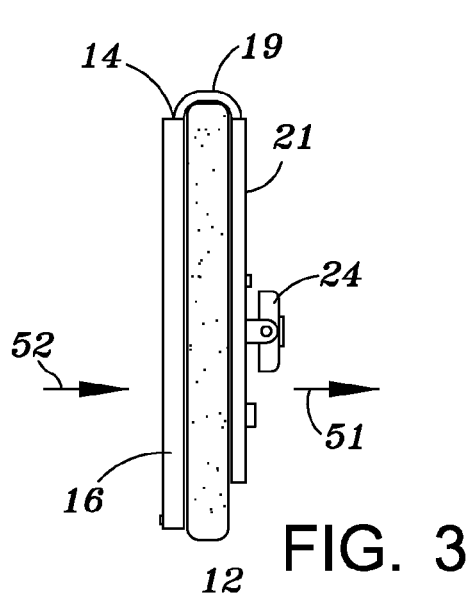
FIG. 3 is a side view of the display device shown in FIG. 1.
Figure 4:
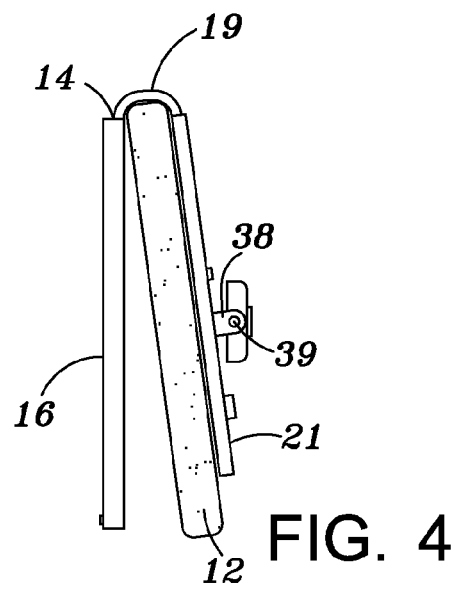
FIG. 4 is a side view of the displace device shown in FIG. 1 with the visor positioned at an angle with respect to a vertical axis.

Computing device 16 may include a central processing unit, a data storage element, a memory storage component, a display screen and hardware/software to perform certain functions described below. Tablets also typically include a touch screen, a battery, speakers, UBS input ports and a SIM slot. A hinge 14 is mounted to the upper perimeter of computing device 16. The hinge 14 is also secured to a clip 19 having a generally U-shaped cross section and extending along the length of the computing device 15. The clip is configured to fit over the top of a conventional visor 12 as shown in FIGS. 3 and 4. A generally flat and front facing support housing 21 is secured to the portion of clip 19 that extends over a front surface of the visor.

This computing device 15, screen 16, hinge 14, clip 19 and housing 21 form a unitary structure that can be positioned over a visor as shown in the drawings.

Housing 21 pivotably supports a forwardly facing digital camera 24. A pair of support arms 38 pivotally support the camera 24 by pivots 39.

This camera 24 will pivot in response to movement of the visor about rod 13 so as to be positioned in a vertical plane. Support housing 21 may also contain suitable electronics to support additional capabilities such as radar detection, motion sensors and GPS capabilities as shown at 22 and 23.

Figure 7:
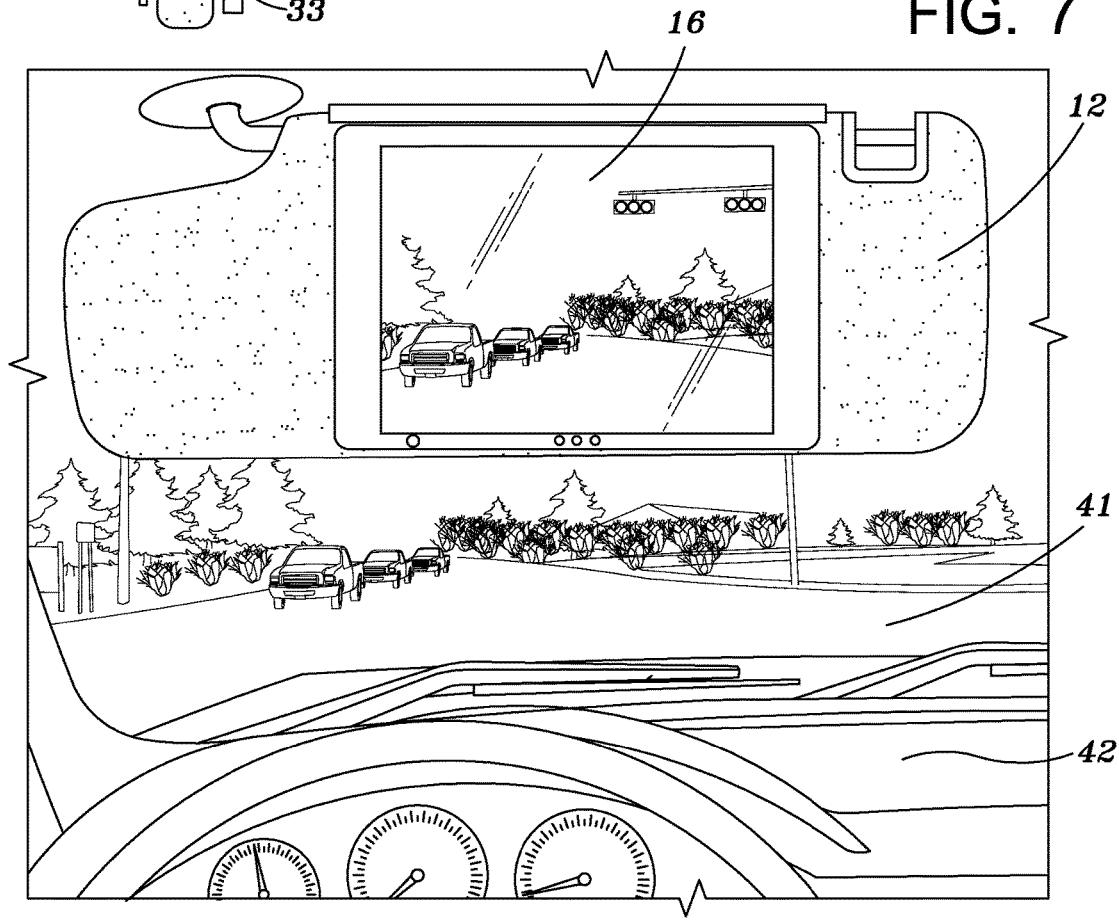
FIG. 7 is a front view of the display device mounted on a visor and showing the full field of vision in the display screen.

When the display device is attached to a visor that has been positioned to a position shown in FIG. 7, digital camera 24 may be activated to send images to display device 16 that represent the lost field of vision with respect to field of vision 41. Thus the operator can observe the entire field of vision.

Figure 5:
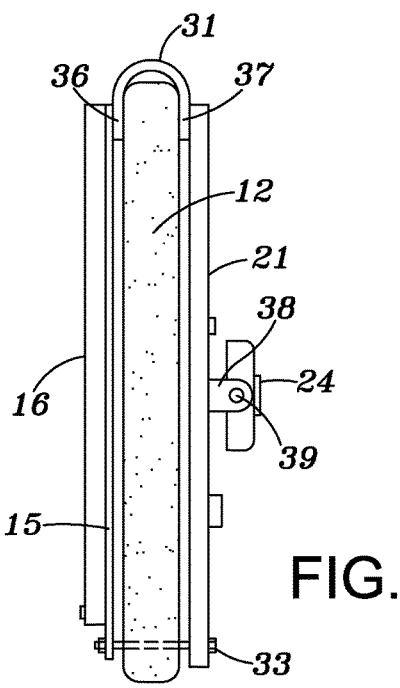
FIG. 5 is a side view of a display device according to a second embodiment of the invention.
Figure 6:
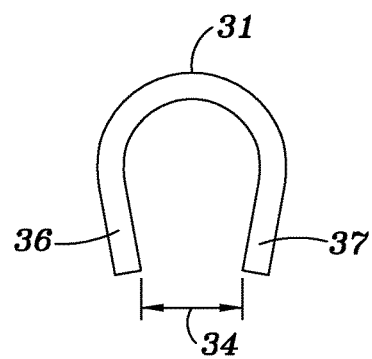
FIG. 6 is a side view of a clamp.

FIGS. 5 and 6 illustrate a second embodiment of the invention. In this embodiment a general U-shaped clamp 31 is formed of a resilient material such as a thin sheet of metal as shown in FIG. 6. The gap 34 of the clamp may be extended by a suitable force applied to the side of the clamp. As shown in FIG. 5, the computing device or table 15 and monitor 16 is rigidly attached to one leg 36 of the clamp and the support housing 21 with camera 24 is rigidly attached to the other leg 37 of the clamp 31. The entire assembly then may be positioned over visor 12.

If desired, a plurality of securing devices 33 may extend through bores formed in computing device 15, visor 12 and housing 21, thus securing the device 10 to the visor 12.

In addition to displaying the image of obstructed landscape, the invention disclosed herein can be utilized to perform several other functions. For example, software applications, commonly call "apps," can be downloaded to or incorporated in the tablet. Examples of such applications can be artificial intelligence and voice commands to control the device, vehicle, and home functions such as security systems. The device can combine GPS, maps and accelerators to maintain a perfect position fix even in the event of bad weather, tunnels or GPS signal lost.

The device could be programmed to recognize traffic lights and their status, as well as brake lights, giving the driver an audible and/or visual warning if approaching a red light at an unsafe speed. The device could also alert the driver to a green light if the vehicle remains stationary after a light changes. Using wireless technology and accelerometers, the smart tablet can function as a full-featured communication, security and artificial intelligence center, as well as an emergency alert and locator system for any vehicle. The tablet could also be equipped with a Bluetooth or FM transmitter to allow seamless integration with any factory or aftermarket audio system. The table may also be used to identify the status of traffic lights that are either red, yellow or green. Emergency systems can be activated in the event of rollover or severe impact.

Additional applications include weather maps and emergency information such as evacuation route details, amber alerts and traffic information.

Rear facing cameras may also be provided to display rear images such as blind spots at the rear of the vehicle and to the left and right side of the vehicle. The cameras may also be infrared sensitive cameras to provide long-range night vision capabilities.

The tablet may also be connected to the vehicle computer so that all the information monitored by the vehicle such as speed, RPMs, fluid temperatures and diagnostic codes can be displayed and manipulated on the tablet screen.

The smart tablet could also be equipped with radar and laser detection technology.

The ability of a smart table to communicate via a wireless network allows the tablet to perform a variety of security functions and endless communication functions including email. GPS technology will allow a user to remotely access to the location of the vehicle from the internet.

The tablet could also be used to establish a "geo fence" which would create an electronic boundary for operation of the vehicle. Notification of the vehicle traveling outside the boundary could be sent to a user. This feature is highly desirable by parents, fleet managers, taxi cab drivers or any other service industry.

Thus, due to its ability to wirelessly connect to the internet and the ever growing availability of "apps" for smart tablets, the invention can be used for virtually an unlimited number of purposes.

Although the present invention has been described with respect to specific details, it is not intended that such details should be regarded as limitations on the scope of the invention, except to the extent that they are included in the accompanying claims. available to the driver.

I claim:

1. A field of vision display device for attachment to a sun visor of a vehicle comprising:
    a computing device including a visual display screen;
    a generally planar support housing having a camera and the visual display screen attached to the housing; and
    means for connecting a top portion of the computer device to a top portion of the support housing so that the display device can be positioned over a top portion of the sun visor.

2. A device as claimed in claim 1 wherein the means for connecting a top portion of the computer device to a top portion of the support housing comprises a hinge.

3. A device as claimed in claim 1 wherein the means for connecting a top portion of the computer device to a top portion of the support housing comprises a resilient clamp having a generally U-shaped cross sectional shape.

4. A device as claimed in claim 1 further including means for pivotally attaching the camera to the support housing for maintaining the camera in a constant orientation with respect to a horizon.

\* \* \* \* \*